(12) United States Patent
Seo

(10) Patent No.: US 8,773,654 B2
(45) Date of Patent: Jul. 8, 2014

(54) SATELLITE TRACKING SYSTEM AND METHOD OF CONTROLLING THE SAME

(71) Applicants: Korea Astronomy and Space Science Institute, Daejeon (KR); Dong-Young Rew, Seoul (KR)

(72) Inventor: Yoon-Kyung Seo, Daejeon (KR)

(73) Assignees: Korea Astronomy and Space Science Institute, Daejeon (KR); Dong-Young Rew, Seoul (KR)

( * ) Notice: Subject to any disclaimer, the term of this patent is extended or adjusted under 35 U.S.C. 154(b) by 0 days.

(21) Appl. No.: 13/930,893

(22) Filed: Jun. 28, 2013

(65) Prior Publication Data
US 2014/0002813 A1  Jan. 2, 2014

(30) Foreign Application Priority Data
Jun. 29, 2012  (KR) .................. 10-2012-0070496

(51) Int. Cl.
*G01B 11/26* (2006.01)
(52) U.S. Cl.
USPC .................................. 356/139.01; 356/139.1
(58) Field of Classification Search
USPC ............. 356/3.01–3.15, 4.01–4.1, 5.01–5.15, 356/6–22, 28, 28.5
See application file for complete search history.

(56) References Cited

U.S. PATENT DOCUMENTS

| 6,774,839 | B2 | 8/2004 | Talbot et al. |
| 7,564,406 | B2 | 7/2009 | Han |
| 2004/0012520 | A1 * | 1/2004 | Talbot et al. ............. 342/357.08 |
| 2011/0285590 | A1 * | 11/2011 | Wellington ................... 342/417 |

FOREIGN PATENT DOCUMENTS

KR  100941687 B1  2/2010

* cited by examiner

*Primary Examiner* — Luke Ratcliffe
(74) *Attorney, Agent, or Firm* — Drinker Biddle & Reath LLP

(57) ABSTRACT

A satellite tracking system and a method of controlling the same, in which the satellite tracking system comprises an ARGO-M Operation System (AOS) and a Tracking Mount System (TMS). The AOS comprises a time & frequency system configured to include a Global Positioning System (GPS) receiver, and to receive Universal Time Coordinated (UTC), and an Interface Control System (ICS) configured to calculate the orbital position data of a satellite using the UTC and per-satellite estimated orbit data by means of Lagrangian interpolation, and to send a command to track the position of the satellite. The TMS comprises a tracking mount configured to support a telescope that measures distance to the satellite, and to operate in accordance with the position of the satellite, and a servo controller configured to receive the orbital position data of the satellite, to receive the UTC, and to send a command to track the satellite.

7 Claims, 5 Drawing Sheets

(a)

(b)

SATELLITE TRACKING SYSTEM AND METHOD OF CONTROLLING THE SAME

CROSS-REFERENCE TO RELATED APPLICATIONS

This application claims priority to and the benefit of Korean Patent Application No. 10-2012-0070496, filed in the Korean Intellectual Property Office on Jun. 29, 2012, the entire contents of which are incorporated herein by reference.

FIELD OF THE INVENTION

Embodiments relate to a satellite tracking system and, more particularly, a satellite tracking system and a method of controlling the same, in which an operation computer generates the estimated position value of a satellite and sends it to a tracking mount, thereby issuing a command to track the satellite.

BACKGROUND

Satellite Laser Ranging (SLR) is a technique that calculates the distance at the mm precision level by emitting a laser beam from the ground station to a specific geodetic satellite and measuring the round trip time of the laser beam reflected and then returned and utilizes the result values of the observation in geodetic survey and geodynamics research and the high precision determination of the orbit of an geodetic satellite. A satellite that is tracked or observed is generally located in an altitude range of 300 km to 23,000 km. In some cases, the satellite may be the COMPASS satellite at an altitude of 42,000 km or a lunar probe satellite, such as Apollo.

In order to select a satellite continuously traveling along an orbit in outer space and emit a laser beam to the satellite from the ground and receive the returned laser beam at an observatory on the ground, special precise technologies are required. In particular, among these technologies, a tracking mount that tracks the current position of a satellite so that laser beams are successively emitted to the satellite via an optical telescope and then received is very important.

Conventional telescopes are chiefly used to perform astronomical observations. Since the telescopes that are used to perform astronomical observations do not require high-speed tracking, equatorial mounting is chiefly employed. However, SLR needs to track the orbits of various satellites, and, in particular, a low-orbit satellite requires high-speed tracking, in which cases altitude-azimuth mounting is employed.

In the case of ARGO-M, which is a mobile SLR system currently under test operation, the diameter of a primary telescope should be 40 cm, and the track precision of a tracking mount should be within 5 arcsec. This means that a satellite can be tracked at a precision within 5 arcsec in spite of the process of transferring the command to track a satellite from an operation system, the uncertainty of the calculation that may occur in the tracking mount, and communication delay.

That is, there is a demand for a system that is capable of performing accurate orbit estimation and operating an optical telescope in accordance with an estimated value in order to enable the accurate position tracking of a satellite via the emission of a laser beam, which is the inherent mission of ARGO-M.

SUMMARY

The invention has been made keeping in mind the above problems occurring in the prior art, and an embodiment provides a satellite tracking system and a method of controlling the same, that are capable of, when tracking the position of a satellite, calculating the orbital position of the satellite at the ARGO-M Operation System (AOS) of the satellite tracking system and minimizing error in the process of transferring the calculated orbital position data of the satellite to a Tracking Mount System (TMS), thereby improving the accuracy of the tracking of a satellite orbit.

An embodiment of the invention provides a satellite tracking system, comprising an ARGO-M Operation System (AOS), comprising a time & frequency system configured to include a Global Positioning System (GPS) receiver, and to receive Universal Time Coordinated (UTC), and an Interface Control System (ICS) configured to calculate the orbital position data of a satellite using the UTC provided from the time & frequency system and estimated per-satellite orbital position data by means of Lagrangian interpolation, and to send a command to track the position of the satellite; and a Tracking Mount System (TMS), comprising a tracking mount configured to support a telescope that emits a laser beam to the satellite, receives the laser beam reflected from the satellite, and measures distance to the satellite, and to operate in accordance with the position of the satellite, and a servo controller configured to receive orbital position data of the satellite from the ICS, to receive the UTC from the time & frequency system, and to send a command to track the satellite in real time to the tracking mount.

A communication interface between the AOS and the TMS may employ User Datagram Protocol/Internet Protocol (UDP/IP).

The time & frequency system may receive the UTC via the GPS receiver included in the time & frequency system, and provide the received UTC to the ICS or servo controller in accordance with IRIG-B protocol or RS-232 protocol.

Another embodiment provides a method of controlling a satellite tracking system, comprising receiving, at a time & frequency system, UTC, and sending, at the time & frequency system, the UTC to an ICS and a servo controller; setting up a basis for current time using the UTC received from the ICS, and calculating a orbital position of a satellite by means of Lagrangian interpolation; sending the position orbit data of the satellite calculated by the ICS to the servo controller using UDP/IP packet format; controlling, at the servo controller, a tracking mount using the orbital position data of the satellite received from the ICS, the UTC received from the time & frequency system, and final position track command data of the satellite; and operating the tracking mount in accordance with the final position track command data of the satellite so that an installed telescope tracks the satellite.

Sending the UTC to the ICS and the servo controller may comprise receiving the UTC via a GPS receiver included in the time & frequency system, and providing the received UTC to the ICS or servo controller in accordance with IRIG-B protocol or RS-232 protocol.

Sending the orbital position data of the satellite calculated by the ICS to the servo controller may comprise sending UDP/IP packet format data transferred from the ICS to the servo controller at uniform time intervals, the uniform time intervals being determined by a user's setting or specifications required by the servo controller.

Sending the orbital position data of the satellite calculated by the ICS to the servo controller comprises, when the UDP/IP packet format data sent from the ICS to the servo controller is omitted, performing, at the servo controller, interpolation on the orbital position data using packets before and after the omission.

Controlling the tracking mount may comprise sending the final position tracking command data of the satellite, transferred by the servo controller to actually control the tracking mount, to the ICS.

The final position tracking command data of the satellite may be transferred using UDP/IP packet format.

In accordance with the embodiments of the invention, the satellite tracking system sends several pieces of time and position data before and after current time, and thus there is no need to take into consideration communication delay.

The invention has the effects of being capable of calculating an accurate track position with respect to reference time, not requiring short communication intervals, and improving the accuracy of the orbital position of a satellite because the data can be dealt with.

BRIEF DESCRIPTION OF THE DRAWINGS

The above and other objects, features and advantages of the invention will be more clearly understood from the following detailed description taken in conjunction with the accompanying drawings, in which.

DETAILED DESCRIPTION

Embodiments will be described with reference to the accompanying drawings in detail so that those having ordinary knowledge in the field of art to which the invention pertains can easily practice the invention. It should be appreciated that the invention may be implemented in various different forms, and are not limited to the embodiments described herein. In the accompanying drawings, portions unrelated to the description are omitted in order to clearly illustrate the invention.

A satellite tracking system in accordance with an embodiment will be described with reference to the accompanying drawings.

First, a satellite tracking system in accordance with an embodiment will be described with reference to FIG. 1 in detail.

Figure 1:
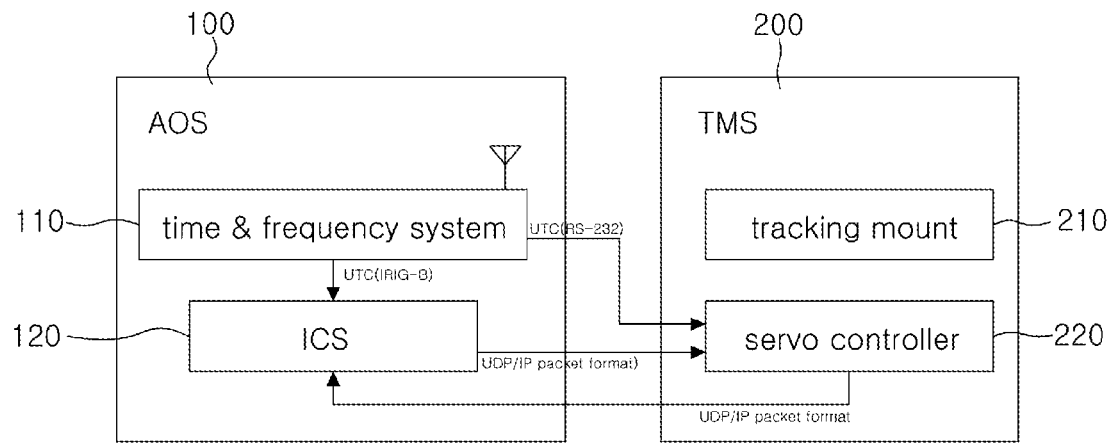
FIG. 1 is a block diagram illustrating the structure of a satellite tracking system in accordance with an embodiment of the invention.
Figure 2:
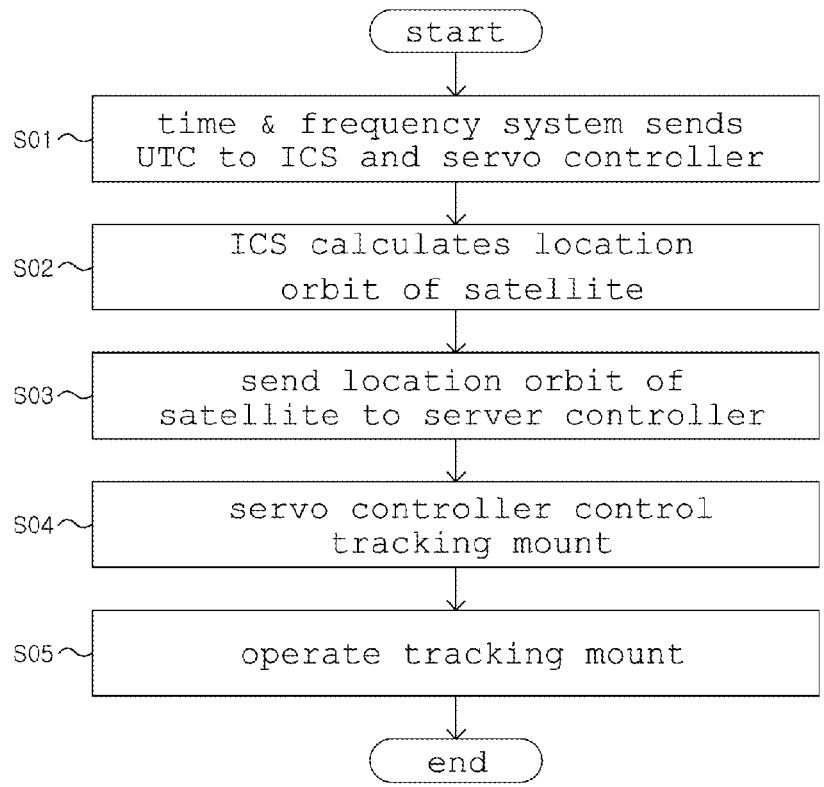
FIG. 2 is a flowchart illustrating a method of controlling a satellite tracking system in accordance with an embodiment of the invention.

Referring to FIG. 1, the satellite tracking system comprises an ARGO-M Operation System (AOS) 100, comprising a time & frequency system 110 and an Interface Control System (ICS) 120, and a Tracking Mount System (TMS) 200, comprising a tracking mount 210 and a servo controller 220.

The time & frequency system 110 comprises a Global Positioning System (GPS) receiver, and receives Coordinated Universal Time (UTC) using the GPS receiver and then provides the UTC to the ICS 120 and the servo controller 220.

The UTC provided to the ICS 120 is sent using IRIG-B protocol, and is provided via a time interface card mounted in the ICS 120.

The UTC provided to the servo controller 220 is provided via an RS-232 serial communication port.

The servo controller 220 is also provided with 10 MHz in order to increase the accuracy of time synchronization of the system, which may vary depending on the specifications of the servo controller 220.

The ICS 120 sets the UTC, provided by the time & frequency system 110, as a basis, and calculates the orbital position data of the satellite, which will be used to control the TMS 200, by applying Lagrangian interpolation to the estimated orbit data of the satellite.

The estimated orbit data of a satellite is provided in Consolidated Prediction Format (CPF) data downloaded from a Crustal Dynamics Data Information System (CDDIS), and uses time information identical to the UTC.

The orbital position data of the satellite calculated as described above is carried in a User Datagram Protocol/Internet Protocol (UPD/IP) packet format, and is sent to the servo controller 220 as a satellite position tracking command.

The tracking mount 210 supports and operates a telescope that radiates laser light toward the satellite and measures the distance to the satellite.

The operation of the tracking mount 210 is controlled by the servo controller 220. The servo controller 220 may be integrated with or separated from the tracking mount 210. The servo controller 220 receives the orbital position data of the satellite calculated by the ICS 120 and then controls the tracking mount 210 based on the orbital position data of the satellite, and may internally perform interpolation on the orbital position data received from the ICS 120 because it may have a separate process. This means that even when packet loss occurred during periodic UDP/IP communication and data has not been received from the ICS 120 for a specific period, position tracking can be performed by internally performing interpolation on existing data.

The servo controller 220 sends an actual satellite position tracking command, that is, data on which interpolation has been performed to control the tracking mount 210, to the ICS 120 using a UDP/IP packet format. This data is used to calculate a total of 8 nodes before and after current time upon extracting the orbital position data of the satellite in real time at the ICS 120, or is used as comparative data that is used to check the accuracy of calculation by being compared with the satellite position tracking command data sent by the ICS 120.

A method of controlling the above-described satellite tracking system will be described in a stepwise manner.

First, the time & frequency system receives UTC and sends the UTC to the ICS 120 and the servo controller 220 at step S01.

The UTC sent to the ICS 120 is sent using IRIG-B protocol in order to achieve time synchronization, and the UTC sent to the servo controller 220 is sent via an RS-232 serial communication port, as set forth in the description of the satellite tracking system.

The basis for current time is set up using the UTC received from the ICS 120 and the orbital position of the satellite is calculated using Lagrangian interpolation at step S02.

Figure 3:
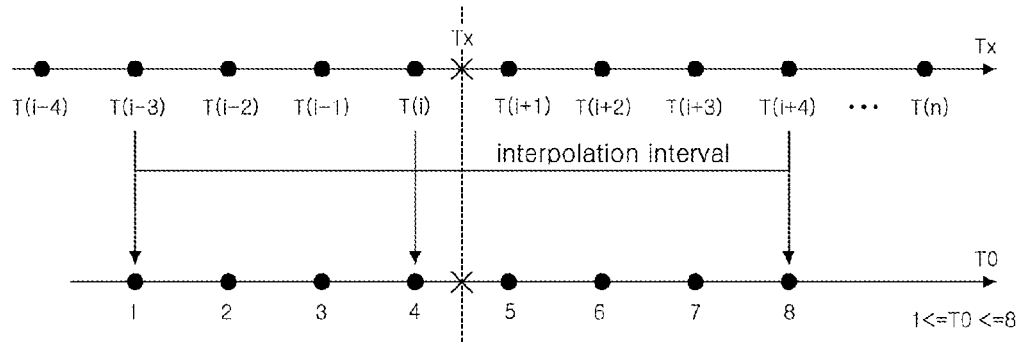
FIG. 3 is a diagram illustrating an algorithm for calculating a satellite position and the rate of variation in position in real time using Lagrangian interpolation in accordance with an embodiment of the invention.

The Lagrangian interpolation used above will be described in greater detail in the later description of FIGS. 3 and 4.

The orbital position of the satellite calculated by the ICS 120 is sent to the servo controller 220 using a UDP/IP packet format at step S03.

The UDP/IP packet format data sent from the ICS to the servo controller as described above is referred to as satellite position tracking command data.

When the satellite position tracking command data is transferred to the servo controller 220, it is sent at specific time intervals that are set by a user or determined in accordance with specifications that are required by the servo controller 220.

Figure 5:
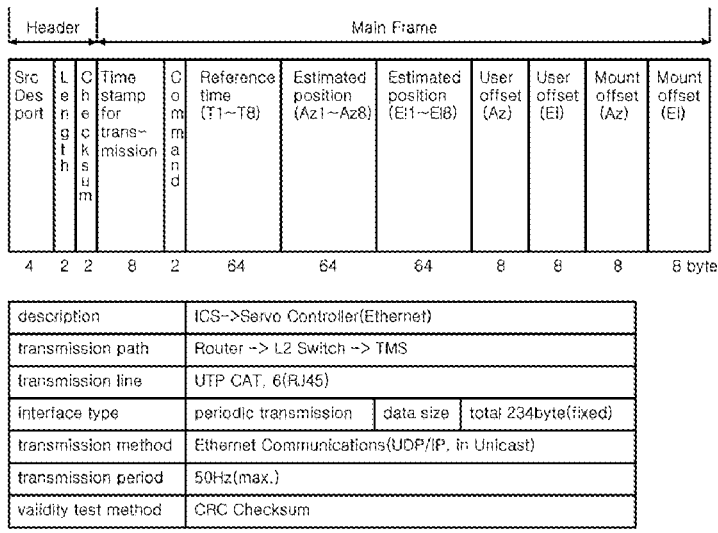
FIG. 5A is a diagram illustrating UDP/IP packet format that is used to transfer orbital position data calculated by an ICS to a servo controller in accordance with an embodiment of the invention.
FIG. 5B is a diagram illustrating UDP/IP packet format that is used to transfer actual orbital position data that the servo controller issues as a command while controlling a tracking mount, to the ICS in accordance with an embodiment of the invention.
Figure 5:
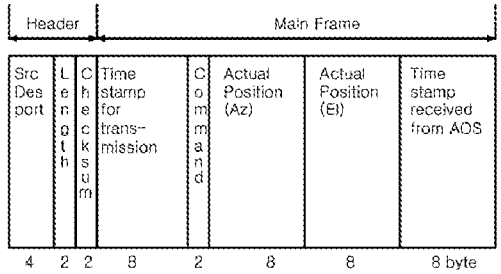

The satellite position tracking command data will be described in detail in the later description of FIG. 5.

The servo controller 220 controls the tracking mount 210 in accordance with actual time using the satellite position tracking command data received from the ICS 120 and the UTC received from the time & frequency system 110 at step S04.

When a packet sent by the ICS 120 is omitted, interpolation may be performed using packets before and after the omitted packet.

The loss of a packet at the servo controller 220 is detected by checking the abnormality of packets that transferred at specific time intervals.

The final command for tracking the satellite that undergoes interpolation is sent to the tracking mount 210 and is actually used to control the tracking mount 210 is sent to the ICS 120, in addition to the tracking mount 210. The final satellite position tracking command data is also sent using a UDP/IP packet format, and will be described in detail in the later description of FIG. 5.

Finally, the tracking mount 210 operates in accordance with the final satellite position tracking command data, so that the mounted telescope tracks the satellite at step S05.

An algorithm for calculating a satellite position and the rate of variation in position in real time using Lagrangian interpolation in accordance with an embodiment of the invention will be described with reference to FIG. 3.

In order to construct the satellite tracking system, the process of accurately tracking the position of the satellite, that is, a tracking target, in real time is required.

A calculation is made at a required time using Lagrangian interpolation and the UTC based on the estimated orbit data of the satellite provided by the CPF data downloaded from the CDDIS in advance.

The Interpolation is performed in the X-Y-Z coordinate system in which there is no rapid variation in numerical value, and the results of the interpolation are converted into values in the latitude-longitude-altitude coordinate system and are then used.

Figure 4:
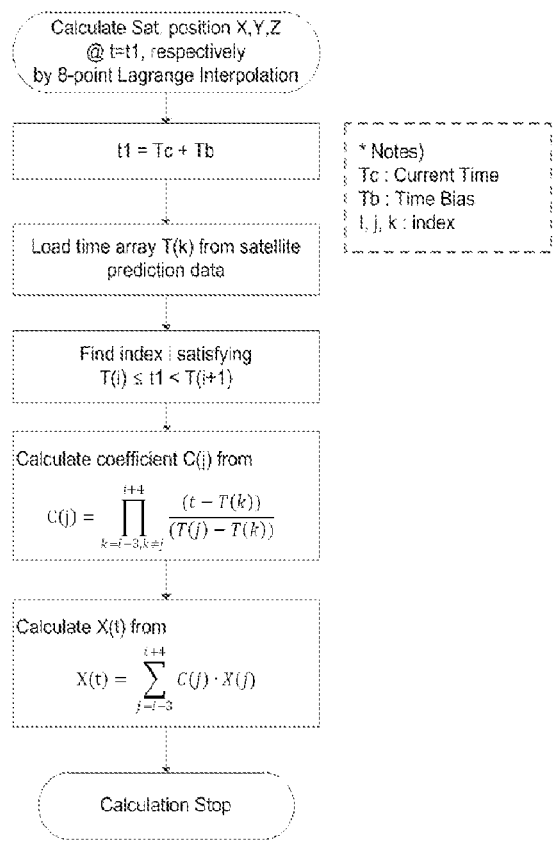
FIG. 4 is a diagram illustrating the calculation of 8 nodes, that is, 4 nodes before and 4 nodes after current time, using Lagrangian interpolation in accordance with an embodiment of the invention.

As illustrated in FIG. 4, Lagrangian interpolation uses 8 nodes, which are 8 positions of the satellite after current time at specific time intervals.

For example, when Lageos2 satellite is tracked, pieces of estimated orbit data of Lageos2 satellite downloaded from the CPF data are presented at intervals of 40 seconds. Pieces of data that will be used in real time are extracted at intervals shorter than 40 seconds in advance by setting the intervals based on the performance of the computer system and applying non-real-time interpolation to the estimated orbit data given at intervals of 40 seconds.

8 azimuth angles and 8 altitude angles are extracted, and are pieces of estimated orbit data corresponding to the time points of a total of 8 nodes, that is, 4 nodes before and 4 nodes after the UTC corresponding to real time.

Real-time satellite orbital position data is calculated using the extracted 8 values and Lagrangian interpolation by means of the following Equations 1 and 2:

$$X(t) = \sum_{j=i-3}^{i+4} C(j) \cdot X(j) \quad (1)$$

$$C(j) = \prod_{k=i-3, k \neq j}^{i+4} \frac{(t - T(k))}{(T(j) - T(k))} \quad (2)$$

The orbital position data of the satellite calculated as described above is sent to the servo controller using UPD/IP packet format.

The UPD/IP packet format is as illustrated in FIGS. 5A and 5B. FIG. 5A illustrates the above-described UPD/IP packet format of data that is sent from the ICS 120 of the AOS 100 to the servo controller 220 of the TMS 200.

The principal components of the packet format will be described below with reference to FIG. 5A.

Information corresponding to the header of a general UDP/IP packet is first provided in the data format. Although a checksum is generated located in the end part of a packet, a checksum in accordance with the invention is located in the end part of the header in order to reduce the time it takes to check normality during the decoding of the packet.

Subsequent fields are a time stamp for transmission, reference time calculated by the ICS 120 using Lagrangian interpolation, and the position trajectory data of a satellite, that is, an estimated position.

A user offset corresponds to a real-time calibration value that is calculated by an operator's manipulation or a program in the process of actually tracking the satellite.

A mount offset that is located at the end of the packet corresponds to the inherent calibration information of the mount, and is determined by star calibration.

The star calibration is performed by observing a star using an installed telescope and then calculating the offset from the center point of the telescope in order to compensate for the error attributable to the offset because there may be a tilt when hardware, such as the telescope and the tracking mount 210, is installed.

FIG. 5B illustrates UPD/IP packet format that is sent from the servo controller 220 to the ICS 120.

FIG. 5B illustrates UDP/IP packet format that is used to carry the actual commanded the orbital position data of the satellite with the tracking mount 210 and send it to the ICS 120 after the information sent via the format of FIG. 5A has been processed by the servo controller 220.

This packet configuration has the same header configuration as the configuration of a packet that is sent via the format of FIG. 5A.

A subsequent field is an actual position, which is the orbital position data of the satellite, that is, an actual command that is currently transferred from the servo controller 220 to the tracking mount 210. The last time stamp received from AOS packet is the time stamp information of a packet that is sent by the ICS 120 and that is a basis when the servo controller 220 calculates the current position of the satellite.

The communication interface should be designed in a very close relationship when the concept of time synchronization is applied. That is, when the concept of time synchronization is applied, the system is not free of the application of a synchronous protocol, such as TCP/IP, and furthermore a reduction in the transmission time between packets can be expected. Furthermore, the system can use various communication methods, such as UDP, that is, a non-synchronous Internet-based protocol, multicasting, and broadcasting, using the UTC-based time stamp.

Since transmission and reception target systems are separately set, UDP/IP is used in order to ensure reliability against communication packet loss.

Figure 6:
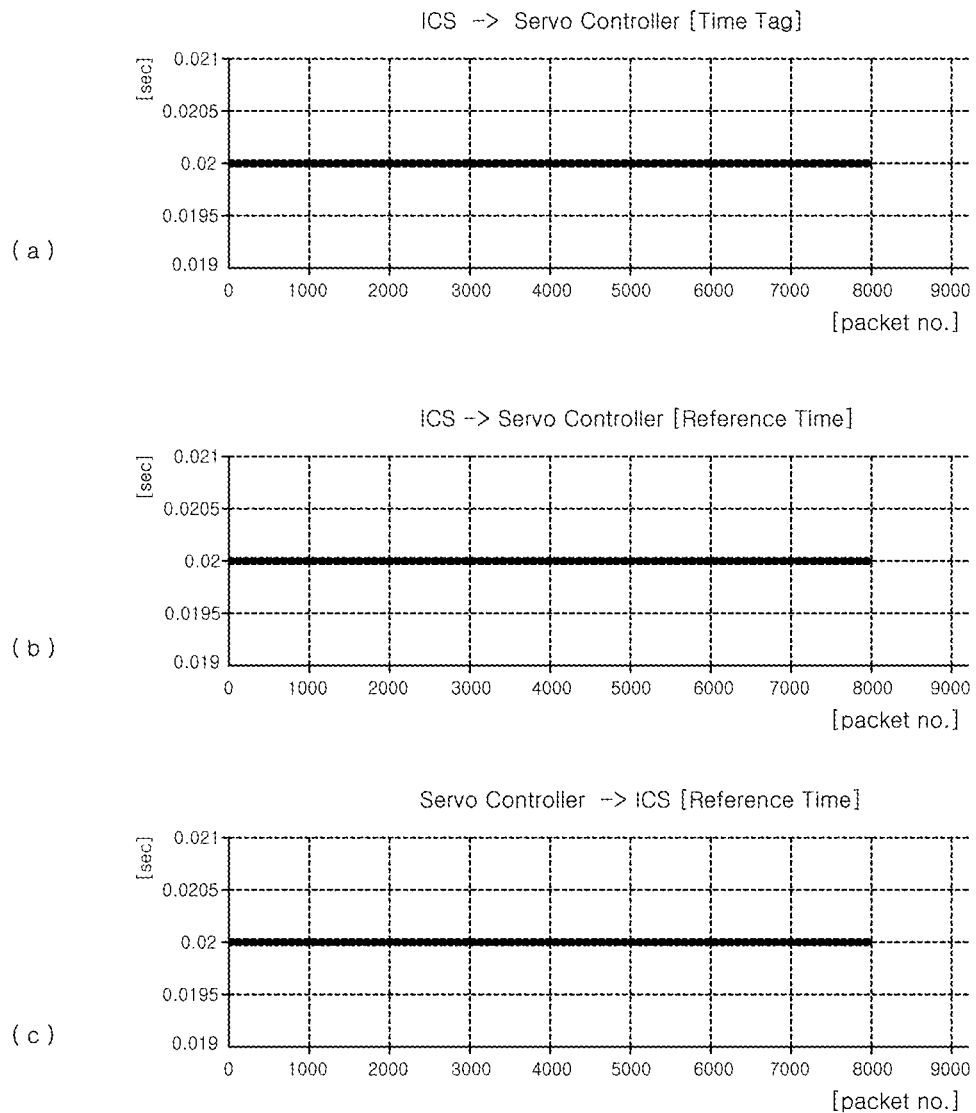
FIGS. 6A to 6C are diagrams illustrating packet transmission intervals between the ICS and the servo controller when an actual single satellite is selected and tracked in accordance with an embodiment of the invention.

FIGS. 6A to 6C are diagrams illustrating packet transmission intervals between the ICS 120 and the servo controller 220 when an actual single satellite is selected and tracked in accordance with an embodiment of the invention.

In this embodiment, the name of the satellite to be tracked is AJISAI, a tracking period is 158 s, and transmission intervals are 20 ms (50 Hz).

FIG. 6A illustrates that when the ICS 120 sends packets to the servo controller 220, transmission intervals are uniform, via the time stamp value of a first sent packet and the time stamp value of a later sent packet.

FIG. 6B illustrates that when the ICS 120 sends packets to the servo controller 220, transmission intervals are uniform, via the reference time value of a first sent packet and the reference time value of a later sent packet.

FIG. 6C illustrates that when the ICS 120 receives packets from the servo controller 220, transmission intervals are uniform, via the reference time value of a first sent packet and the reference time value of a later sent packet.

As illustrated in FIGS. 6A to 6C, it can be seen that in each graph, a curve that appears when the reference value of time synchronization is stamped assumes almost a rectilinear shape and uniformly continues, via which and it can be seen that communication using UDP/IP packet format between the ICS 120 and the servo controller 220 uniformly continues in terms of performance.

Figure 7:
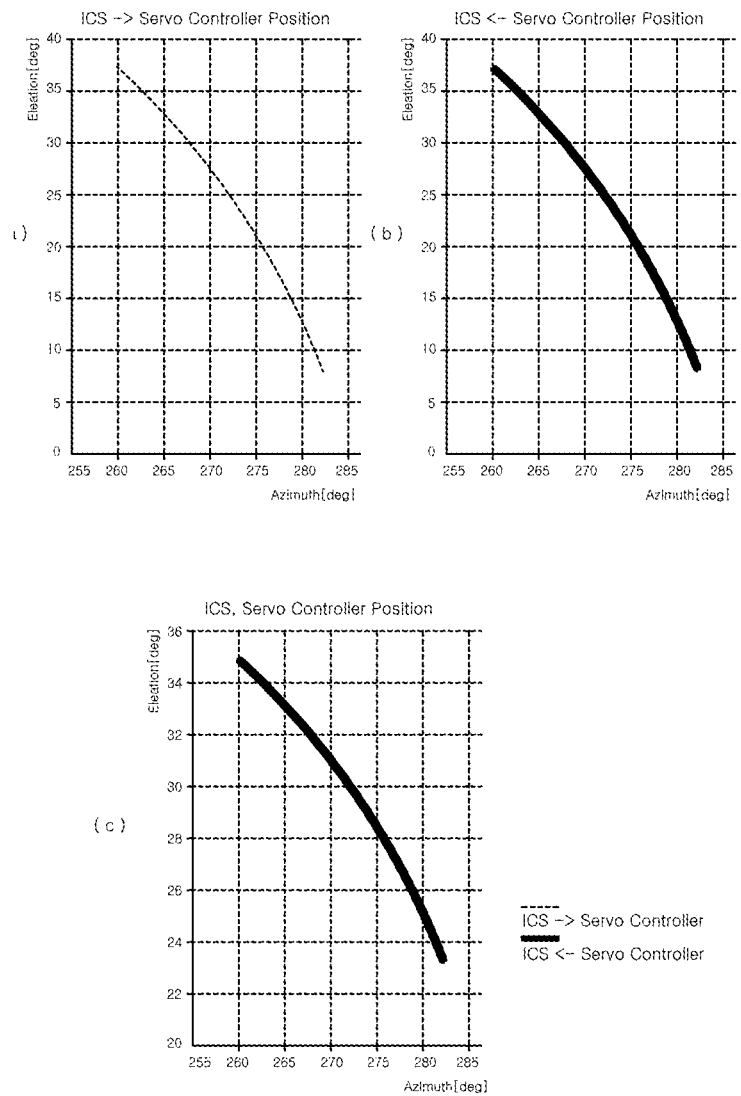
FIGS. 7A to 7C are diagrams illustrating the performance of the satellite tracking system of the invention using the results of FIGS. 6A to 6C.

FIGS. 7A to 7C are diagrams illustrating the performance of the satellite tracking system of the invention using the results of FIGS. 6A to 6C.

FIG. 7A is a graph on which the orbital position data values of the satellite that are calculated by the ICS 120 using Lagrangian interpolation and sent to the servo controller 220 are plotted.

FIG. 7B is a graph on which the actual tracking values of the satellite that are received by the ICS 120 from the servo controller 220 are plotted.

FIG. 7C is a matching graph in which the graphs of FIGS. 7A and 7B are compared with each other.

From FIG. 7C, it can be seen that the track performance of the satellite tracking system can be verified based on the fact that the orbital position data value of the satellite calculated by the ICS 120 is identical to the orbital position data of the satellite actually measured.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A satellite tracking system, comprising:
    an ARGO-M Operation System (AOS), comprising a time & frequency system configured to comprise a Global Positioning System (GPS) receiver, and to receive Universal Time Coordinated (UTC), and an Interface Control System (ICS) configured to calculate orbital position data of a satellite using the UTC provided from the time & frequency system and per-satellite estimated orbit data by means of Lagrangian interpolation, and to send the orbital position data using UDP/IP packet format at uniform time intervals determined by a user's setting or specifications require by the servo controller; and
    a Tracking Mount System (TMS), comprising a tracking mount configured to support a telescope that emits a laser beam to the satellite, receives the laser beam reflected from the satellite, and measures distance to the satellite, and to operate in accordance with the position of the satellite, and a servo controller configured to receive the orbital position data of the satellite from the ICS and the UTC from the time & frequency system, and to send a command to track the satellite in real time to the tracking mount for controlling an operation of the TMS.

2. The satellite tracking system of claim 1, wherein the time & frequency system receives the UTC via the GPS receiver included in the time & frequency system, and provides the received UTC to the ICS or servo controller in accordance with IRIG-B protocol or RS-232 protocol.

3. A method of controlling a satellite tracking system, comprising:
    receiving, at a time & frequency system, UTC, and sending, at the time & frequency system, the UTC to an ICS and a servo controller;
    setting up a basis for current time using the UTC received from the ICS, and calculating an orbital position of a satellite by means of Lagrangian interpolation;
    sending the orbital position data of the satellite calculated by the ICS to the servo controller using UDP/IP packet format at uniform time intervals determined by a user's setting or specifications required by the servo controller;
    controlling, at the servo controller, a tracking mount using the orbital position data of the satellite received from the ICS, the UTC received from the time & frequency system, and final position track command data of the satellite; and
    operating the tracking mount in accordance with the final position track command data of the satellite so that an installed telescope tracks the satellite.

4. The method of claim 3, wherein sending the UTC to the ICS and the servo controller comprises receiving the UTC via a GPS receiver included in the time & frequency system, and providing the received UTC to the ICS or servo controller in accordance with IRIG-B protocol or RS-232 protocol.

5. The method of claim 3, wherein sending the position orbit data of the satellite calculated by the ICS to the servo controller comprises, when the UDP/IP packet format data sent from the ICS to the servo controller is omitted, performing, at the servo controller, interpolation on the orbital position data using packets before and after the omission.

6. The method of claim 3, wherein controlling the tracking mount comprises sending the final position tracking command data of the satellite, transferred by the servo controller to actually control the tracking mount, to the ICS.

7. The method of claim 6, wherein the final position tracking command data of the satellite is transferred using UDP/IP packet format.

* * * * *